US012670832B2

(12) United States Patent
Kim et al.

(10) Patent No.: US 12,670,832 B2
(45) Date of Patent: Jun. 30, 2026

(54) CLOCK SELECTION CIRCUIT TO OUTPUT CLOCK SIGNALS IN RESPONSE TO FIRST AND SECOND CONTROL SIGNALS, DISPLAY DEVICE INCLUDING THE SAME, AND METHOD OF DRIVING THE SAME

(71) Applicant: Samsung Display Co., LTD., Yongin-si (KR)

(72) Inventors: Kyung Ho Kim, Yongin-si (KR); Gi Chang Lee, Yongin-si (KR); Sung Yoon Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/819,235

(22) Filed: Aug. 29, 2024

(65) Prior Publication Data

US 2025/0124845 A1 Apr. 17, 2025

(30) Foreign Application Priority Data

Oct. 11, 2023 (KR) ........................ 10-2023-0135313

(51) Int. Cl.

| | |
|---|---|
| ***G09G 3/20*** | (2006.01) |
| *G09G 3/32* | (2016.01) |
| *G09G 3/3266* | (2016.01) |
| *G09G 3/36* | (2006.01) |

(52) U.S. Cl.

CPC ............. *G09G 3/2092* (2013.01); *G09G 3/20* (2013.01); *G09G 3/32* (2013.01); *G09G 3/3266* (2013.01); *G09G 3/3677* (2013.01); *G09G 2300/0814* (2013.01); *G09G 2310/0267* (2013.01); *G09G 2310/0286* (2013.01); *G09G 2310/08* (2013.01); *G09G 2330/021* (2013.01); *G09G 2330/023* (2013.01)

(58) Field of Classification Search

CPC .......... G09G 3/20; G09G 3/2092; G09G 3/32; G09G 3/3266; G09G 3/3677; G09G 2300/0814; G09G 2310/0267; G09G 2310/0286; G09G 2310/08; G09G 2330/021; G09G 2330/023

See application file for complete search history.

(56) References Cited

U.S. PATENT DOCUMENTS

| | | | |
|---|---|---|---|
| 8,810,498 | B2 | 8/2014 | Kim et al. |
| 10,319,283 | B2 | 6/2019 | Kim et al. |
| 10,553,167 | B2 | 2/2020 | Mitsuzawa et al. |
| 11,158,265 | B2 | 10/2021 | Seo et al. |
| 12,073,791 | B2 | 8/2024 | In et al. |

(Continued)

FOREIGN PATENT DOCUMENTS

| | | | |
|---|---|---|---|
| JP | 2019-12262 | A | 1/2019 |
| KR | 10-1710661 | B1 | 2/2017 |

(Continued)

*Primary Examiner* — Adam J Snyder

(74) *Attorney, Agent, or Firm* — Womble Bond Dickinson (US) LLP

(57) ABSTRACT

A clock selection circuit includes: a control circuit to output a first control signal and a second control signal, when at least one scan signal of a previous stage scan signal or a next stage scan signal is input; and a selection circuit to receive clock signals, and output the clock signals when the first control signal and the second control signal are input.

26 Claims, 9 Drawing Sheets

(56) References Cited

U.S. PATENT DOCUMENTS

| | | | | |
|---|---|---|---|---|
| 2001/0011987 | A1* | 8/2001 | Kubota | G11C 19/28<br>345/98 |
| 2006/0061385 | A1* | 3/2006 | Jinta | G11C 19/00<br>326/81 |
| 2017/0148392 | A1 | 5/2017 | Kim | |
| 2017/0365220 | A1* | 12/2017 | Huang | G11C 19/287 |
| 2024/0054959 | A1 | 2/2024 | Kim et al. | |
| 2024/0265847 | A1 | 8/2024 | Kim et al. | |

FOREIGN PATENT DOCUMENTS

| | | | |
|---|---|---|---|
| KR | 10-2017-0060953 | A | 6/2017 |
| KR | 10-2017-0071217 | A | 6/2017 |
| KR | 10-2021-0104200 | A | 8/2021 |
| KR | 10-2023-0064697 | A | 5/2023 |
| KR | 10-2024-0023342 | A | 2/2024 |
| KR | 10-2024-0123892 | A | 8/2024 |

* cited by examiner

CKL1
(CK1)
CKL2
(CK2)
150
130
140
CS11
SSP
CSP
CIN1
SIN1
COUT1
sCK11
ST1
IN1
OUT1
CS11
SC1
SS1
IN3
CC1
CIN2
SIN2
COUT2
sCK21
IN2
OUT2
CS21
CS21
CS12
SS1
CIN1
SIN1
COUT1
sCK12
IN1
OUT1
CS12
SC2
ST2
SS2
IN3
CC2
CIN2
SIN2
COUT2
sCK22
IN2
OUT2
CS22
CS22
SS2
SS3
CS1i
SSi-1
CIN1
SIN1
COUT1
sCK1i
IN1
OUT1
CS1i
SCi
STi
SSi
IN3
CCi
CIN2
SIN2
COUT2
sCK2i
IN2
OUT2
CS2i
CS2i
SSi
SSi+1
CS1n
SSn-1
CIN1
SIN1
COUT1
sCK1n
IN1
OUT1
CS1n
SCn
STn
SSn
IN3
CCn
CIN2
SIN2
COUT2
sCK2n
IN2
OUT2
CS2n
CS2n
ENP

COS: (CCi-1, SCi-1), (CCi, SCi), (CCi+1, SCi+1)

CLOCK SELECTION CIRCUIT TO OUTPUT CLOCK SIGNALS IN RESPONSE TO FIRST AND SECOND CONTROL SIGNALS, DISPLAY DEVICE INCLUDING THE SAME, AND METHOD OF DRIVING THE SAME

CROSS-REFERENCE TO RELATED APPLICATION

The present application claims priority to and the benefit of Korean Patent Application No. 10-2023-0135313, filed on Oct. 11, 2023, in the Korean Intellectual Property Office, the entire disclosure of which is incorporated by reference herein.

BACKGROUND

1. Field

Aspects of embodiments of the present disclosure relate to a clock selection circuit, a display device including the same, and a method of driving the same.

2. Description of the Related Art

As information society develops, demand for a display device for displaying an image has been increasing in various forms. For example, the display device is being applied to various electronic devices, such as a smart phone, a digital camera, a notebook computer, a navigation device, and a smart television.

The display device displays an image using pixels. The display device may include a plurality of scan drivers to drive the pixels.

SUMMARY

Embodiments of the present disclosure may be directed to a clock selection circuit capable of minimizing or reducing power consumption, a display device including the same, and a method of driving the same.

According to one or more embodiments of the present disclosure, a clock selection circuit includes: a control circuit configured to output a first control signal and a second control signal, when at least one scan signal of a previous stage scan signal or a next stage scan signal is input; and a selection circuit configured to receive clock signals, and output the clock signals when the first control signal and the second control signal are input.

In an embodiment, the control circuit may include: a first logic gate configured to: receive the previous stage scan signal through a first input terminal, and the next stage scan signal through a second input terminal; and output the first control signal through a first output terminal; and a second logic gate configured to: receive the first control signal; and output the second control signal through a second output terminal by inverting the first control signal.

In an embodiment, the previous stage scan signal and the next stage scan signal may have a high level voltage, and the first logic gate may be configured to output a low level of the first control signal by performing a NOR operation on the previous stage scan signal and the next stage scan signal.

In an embodiment, the first logic gate may include: a first transistor and a second transistor connected in series with each other between a first power source and a first node; and a third transistor and a fourth transistor connected in parallel with each other between the first node and a second power source having a voltage lower than that of the first power source. The first transistor and the second transistor may be P-type transistors, and the third transistor and the fourth transistor may be N-type transistors.

In an embodiment, a gate electrode of the first transistor and a gate electrode of the third transistor may be connected to the first input terminal, and a gate electrode of the second transistor and a gate electrode of the fourth transistor may be connected to the second input terminal.

In an embodiment, the first logic gate may further include a third input terminal configured to receive a current stage scan signal.

In an embodiment, the first logic gate may further include: a fifth transistor connected in series to the first transistor and the second transistor between the first power source and the first node; and a sixth transistor connected in parallel to the third transistor and the fourth transistor between the first node and the second power source. The fifth transistor may be a P-type transistor and the sixth transistor may be an N-type transistor.

In an embodiment, a gate electrode of the fifth transistor and a gate electrode of the sixth transistor may be connected to the third input terminal.

In an embodiment, the second logic gate may be an inverter configured to output the second control signal by inverting the first control signal.

In an embodiment, the second logic gate may include a P-type first transistor and an N-type second transistor that may be connected in series with each other between a first power source and a second power source having a voltage lower than that of the first power source. A gate electrode of the P-type first transistor and a gate electrode of the N-type second transistor may be connected to the first output terminal, and a common node between the P-type first transistor and the N-type second transistor may be connected to the second output terminal.

In an embodiment, the selection circuit may include: a first transmission gate connected between a first clock input terminal and a first clock output terminal, the first clock input terminal being configured to receive a first clock signal, and the first transmission gate being configured to be turned on when the first control signal and the second control signal are input; and a second transmission gate connected between a second clock input terminal and a second clock output terminal, the second clock input terminal being configured to receive a second clock signal, and the second transmission gate being configured to be turned on when the first control signal and the second control signal are input.

In an embodiment, the first transmission gate may include a P-type first control transistor and an N-type second control transistor that may be connected in parallel with each other between the first clock input terminal and the first clock output terminal. The P-type first control transistor may be configured to be turned on when the first control signal is input, and the N-type second control transistor may be configured to be turned on when the second control signal is input.

In an embodiment, the second transmission gate may include a P-type first control transistor and an N-type second control transistor that may be connected in parallel with each other between the second clock input terminal and the second clock output terminal. The P-type first control transistor may be configured to be turned on when the first control signal is input, and the N-type second control transistor may be configured to be turned on when the second control signal is input.

According to one or more embodiments of the present disclosure, a display device includes: pixels connected to scan lines and data lines; a scan driver configured to supply a scan signal to the scan lines; a clock controller configured to sequentially output a first control signal and a second control signal in a horizontal line unit in response to the scan signal sequentially input in the horizontal line unit; and a clock selector configured to receive clock signals for driving the scan driver, and supply the clock signals to the scan driver in the horizontal line unit in response to the first control signal and the second control signal.

In an embodiment, the scan driver may include a stage circuit located for each horizontal line, the clock controller may include a control circuit located for each horizontal line, and the clock selector may include a selection circuit located for each horizontal line.

In an embodiment, a stage circuit of a first horizontal line may be configured to receive a scan start signal, and a control circuit of the first horizontal line may be configured to receive a clock start signal overlapping with the scan start signal.

In an embodiment, a control circuit of a last horizontal line may be configured to receive an end signal overlapping with a scan signal corresponding to the last horizontal line during a partial period.

In an embodiment, an i-th control circuit of an i-th horizontal line may be configured to output the first control signal and the second control signal in response to a previous scan signal of a previous horizontal line and a next scan signal of a next horizontal line, where i may be a natural number.

In an embodiment, the i-th control circuit may include: a first logic gate configured to generate the first control signal by performing a NOR operation on the previous scan signal and the next scan signal; and a second logic gate configured to generate the second control signal by inverting the first control signal.

In an embodiment, an i-th control circuit of an i-th horizontal line may be configured to output the first control signal and the second control signal in response to a previous scan signal of a previous horizontal line, a current scan signal of a current horizontal line, and a next scan signal of a next horizontal line, where i may be a natural number.

In an embodiment, the i-th control circuit may include: a first logic gate configured to generate the first control signal by performing a NOR operation on the previous scan signal, the current scan signal, and the next scan signal; and a second logic gate configured to generate the second control signal by inverting the first control signal.

In an embodiment, an i-th selection circuit of an i-th horizontal line may be configured to receive a first clock signal and a second clock signal, and supply the first clock signal and the second clock signal to an i-th stage circuit of the i-th horizontal line when an i-th first control signal and an i-th second control signal are input from an i-th control circuit of the i-th horizontal line, where i may be a natural number.

In an embodiment, the i-th selection circuit may include: a first transmission gate configured to receive the first clock signal, and supply the first clock signal to the i-th stage circuit by being turned on when the i-th first control signal and the i-th second control signal are supplied; and a second transmission gate configured to receive the second clock signal, and supply the second clock signal to the i-th stage circuit by being turned on when the i-th first control signal and the i-th second control signal are supplied.

In an embodiment, the i-th stage circuit may include a transmission gate configured to be turned on and turned off in response to the first clock signal and the second clock signal.

According to one or more embodiments of the present disclosure, a method of driving a display device, includes: sequentially generating a scan signal in a scan driver; sequentially generating a first control signal and a second control signal in a clock controller in response to the scan signal; and sequentially supplying clock signals used for generating the scan signal from a clock selector to the scan driver in response to the first control signal and the second control signal.

In an embodiment, the clock controller may generate a first-first control signal and a first-second control signal corresponding to a first horizontal line in response to a clock start signal overlapping with a scan start signal supplied to the scan driver.

According to one or more embodiments of the present disclosure, in the clock selection circuit, the display device including the same, and the method of driving the same, power consumption may be reduced by selectively supplying a clock to the scan driver.

However, the aspects and features of the present disclosure are not limited to those described above. Additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
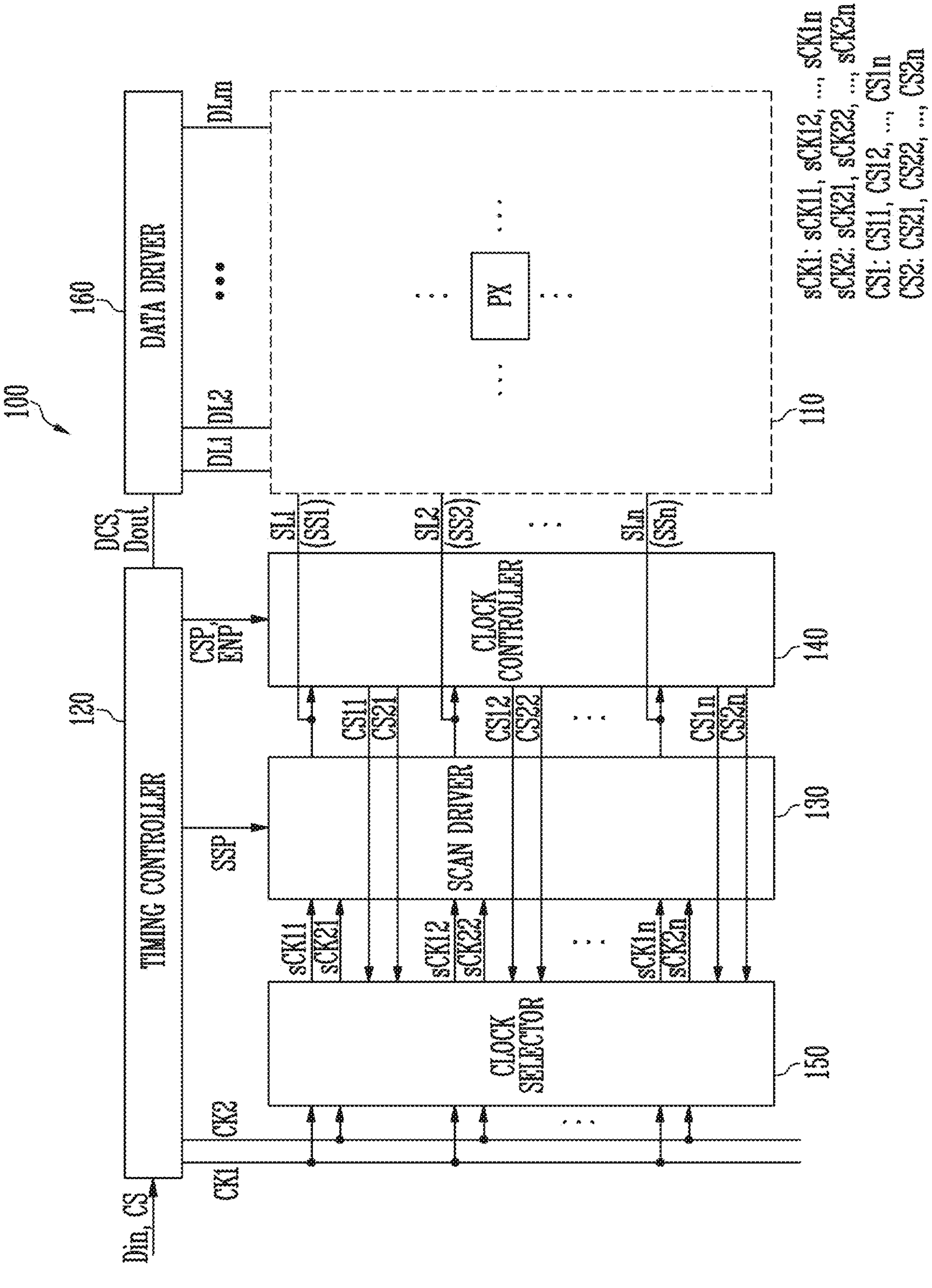
FIG. 1 is a diagram illustrating a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Some embodiments are described with reference to the accompanying drawings in relation to a functional block, unit, and/or module. Those skilled in the art will understand that such block, unit, and/or module are/is physically implemented by a logic circuit, an individual component, a microprocessor, a hard wire circuit, a memory element, a line connection, and/or other electronic circuits. These may be formed using a semiconductor-based manufacturing technique or other manufacturing techniques. The block, unit, and/or module implemented by a microprocessor or other similar hardware may be programmed and controlled using software to perform various functions described herein, and optionally, may be driven by firmware and/or software.

In addition, each block, unit, and/or module may be implemented by dedicated hardware, or a combination of dedicated hardware that performs some functions and a processor (e.g., one or more programmed microprocessors and related circuits) that performs a function different from those of the dedicated hardware. In addition, in some embodiments, the block, unit, and/or module may be physically separated into two or more interactive individual blocks, units, and/or modules. In addition, in some embodiments, the block, unit and/or module may be physically combined into more complex blocks, units, and/or modules.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device according to an embodiment of the present disclosure.

Referring to FIG. 1, the display device 100 according to an embodiment of the present disclosure may include a pixel unit 110 (e.g., a display panel), a timing controller 120, a scan driver 130, a data driver 160, a clock controller 140, and a clock selector 150.

The pixel unit 110 may include a plurality of pixels PX connected to scan lines SL1, SL2, . . . , and SLn and data lines DL1, DL2, . . . , and DLm (where n and m are natural numbers equal to or greater than 3). The pixels PX may be sub-pixels.

The pixels PX may be configured of various suitable kinds of circuits as would be understood by those having ordinary skill in the art, and the number of scan lines connected to each of the pixels PX may vary (e.g., may be variously set or determined) in correspondence with a structure of the pixels PX. In addition, each of the pixels PX may be additionally connected to an emission control line or the like in correspondence with the structure of the pixels PX.

When a scan signal is supplied to the scan lines SL1 to SLn, the pixels PX may be selected in a horizontal line unit (e.g., the pixels PX connected to the same scan line may be classified into one horizontal line (e.g., one pixel row)), and the pixels PX selected by the scan signal may receive a data signal from a data line (e.g., any one of DL1 to DLm) connected thereto. The pixels PX receiving the data signal may generate light of a desired luminance (e.g., a predetermined luminance) in response to a voltage of the data signal.

The scan driver 130 may receive a scan start signal SSP from the timing controller 120. In addition, the scan driver 130 may receive selection clock signals sCK1 (e.g., sCK11, sCK12, . . . , and sCK1*n*) and sCK2 (e.g., sCK21, sCK22, . . . , and sCK2*n*) from the clock selector 150. The selection clock signals sCK1 and sCK2 may be supplied sequentially in the horizontal line unit. The scan driver 130 may sequentially supply the scan signal to the scan lines SL1 to SLn, while shifting the scan start signal SSP in response to the selection clock signals sCK1 and sCK2.

As used herein, the supply of the scan signal may refer to a gate-on voltage of the scan signal at which a transistor included in the pixels PX and receiving the scan signal may be turned on, which is supplied to the scan lines SL1 to SLn. In addition, when the scan signal is referred to as not supplied (or supply stop), the scan signal having a gate-off voltage at which the transistor included in the pixels PX and receiving the scan signal may be turned off may be supplied to the scan lines SL1 to SLn. For example, a low level of the scan signal may be supplied to a P-type transistor to turn on the P-type transistor, and a high level of the scan signal may be supplied to an N-type transistor to turn on the N-type transistor. Hereafter, for convenience, it is assumed that the scan signal has a high level voltage.

In an embodiment, the scan driver 130 may be disposed in the display device 100 as a separate integrated circuit (IC). In an embodiment, the scan driver 130 may be formed together with the pixels PX in a formation process of the pixel unit 110. For example, the scan driver 130 may be formed in the pixel unit 110 as an oxide semiconductor thin film transistor gate driver circuit (OSG) type, or an amorphous silicon thin film transistor gate driver circuit (ASG) type.

The data driver 160 may receive output data Dout and a data driving signal DCS from the timing controller 120. The data driving signal DCS may include a sampling signal and/or timing signals used for driving the data driver 160. The data driver 160 may generate a data signal based on the data driving signal DCS and the output data Dout. For example, the data driver 160 may generate an analog data signal based on a grayscale (e.g., a grayscale level or value) of the output data Dout. The data driver 160 may supply the data signal to the data lines DL1 to DLm to be synchronized with the scan signal.

The timing controller 120 may receive input data Din and a control signal CS from a host system through an interface. For example, the timing controller 120 may receive the input data Din and the control signal CS from at least one of a graphics processing unit (GPU), a central processing unit (CPU), and/or an application processor (AP) included in the host system. The control signal CS may include various suitable signals including a clock signal.

The timing controller 120 may generate the data driving signal DCS based on the control signal CS, and may supply the generated data driving signal DCS to the data driver 160. The timing controller 120 may rearrange the input data Din to match a specification of the display device 100. In addition, the timing controller 120 may correct the input data Din to generate the output data Dout, and may supply the output data Dout to the data driver 160. In an embodiment, the timing controller 120 may correct the input data Din in response to an optical measurement result measured in a process.

The timing controller 120 may supply clock signals CK1 and CK2 used for driving the scan driver 130 to the clock selector 150. In addition, the timing controller 120 may supply the scan start signal SSP to the scan driver 130, and may supply a clock start signal CSP and an end signal ENP to the clock controller 140. Although two clock signals CK1 and CK2 are shown in FIG. 1, the present disclosure is not limited thereto, and one or more clock signals may be supplied to the clock selector 150.

The clock controller 140 may output first and second control signals CS1 (e.g., CS11, CS12, . . . , and CS1*n*) and CS2 (e.g., CS21, CS22, . . . , and CS2*n*) sequentially in the horizontal line unit in response to the clock start signal CSP supplied from the timing controller 120 and the scan signal supplied from the scan driver 130.

The first control signal CS1 may have (e.g., may be set to) a low level (or a high level) voltage, and the second control signal CS2 may have (e.g., may be set to) a high level (or a low level) voltage. In an embodiment, the second control signal CS2 corresponding to a specific horizontal line may be generated by inverting the first control signal CS1 of the specific horizontal line.

The clock selector 150 may receive the control signals CS1 and CS2 and the clock signals CK1 and CK2. The clock selector 150 may output the clock signals CK1 and CK2 sequentially in the horizontal line unit in response to the control signals CS1 and CS2 supplied sequentially in the horizontal line unit. Here, the clock signals CK1 and CK2 output in the horizontal line unit may be referred to as the selection clock signals sCK1 and sCK2.

In an embodiment, the clock selector 150 may output the selection clock signals sCK11 and sCK21 corresponding to a first horizontal line during a period in which the first control signal CS11 and the second control signal CS21 corresponding to the first horizontal line are input. Then, the scan driver 130 may supply the scan signal to the scan line SL1 positioned on the first horizontal line in response to the selection clock signals sCK11 and sCK21.

In an embodiment, the clock selector 150 may output the selection clock signals sCK12 and sCK22 corresponding to a second horizontal line during a period in which a first control signal CS12 and a second control signal CS22 corresponding to the second horizontal line are input. Then, the scan driver 130 may supply the scan signal to the scan line SL2 positioned on the second horizontal line in response to the selection clock signals sCK12 and sCK22.

In an embodiment, the clock selector 150 may output the selection clock signals sCK1*n* and sCK2*n* corresponding to an n-th horizontal line during a period in which a first control signal CS1*n* and a second control signal CS2*n* corresponding to the n-th horizontal line are input. Then, the scan driver 130 may supply the scan signal to the scan line SLn positioned on the n-th horizontal line in response to the selection clock signals sCK1*n* and sCK2*n*.

In an embodiment of the present disclosure, the clock signals CK1 and CK2 may be selectively supplied in the horizontal line unit using the clock controller 140 and the clock selector 150. In this case, a stage circuit included in the scan driver 130 and positioned for each horizontal line receives the selection clock signals sCK1 and sCK2 during (e.g., only during) a period in which the scan signal is generated, and does not receive the selection clock signals sCK1 and sCK2 during other periods. In other words, in an embodiment of the present disclosure, the clock signals CK1 and CK2 may be selectively supplied to the stage circuit, and thus, power consumption may be reduced.

In an embodiment of the present disclosure, the display device 100 may include a flat or substantially flat display device, a curved display device in which a portion of the pixel unit 110 is bent, a flexible display device in which a portion may be folded or bent, and/or a stretchable display device in which a portion may be expanded and contracted.

In an embodiment of the present disclosure, the display device 100 may be a device that displays a moving image or a still image, and may include a portable electronic device, such as a mobile phone, a smart phone, a tablet personal computer (PC), a smart watch, a watch phone, a mobile communication terminal, an electronic notebook, an e-book, a portable multimedia player (PMP), a navigation system, and/or an ultra mobile PC (UMPC). In an embodiment of the present disclosure, the display device 100 may include an electronic device, such as a television, a notebook computer, a monitor, a billboard, or an Internet of things (IoT) device.

Figure 2:
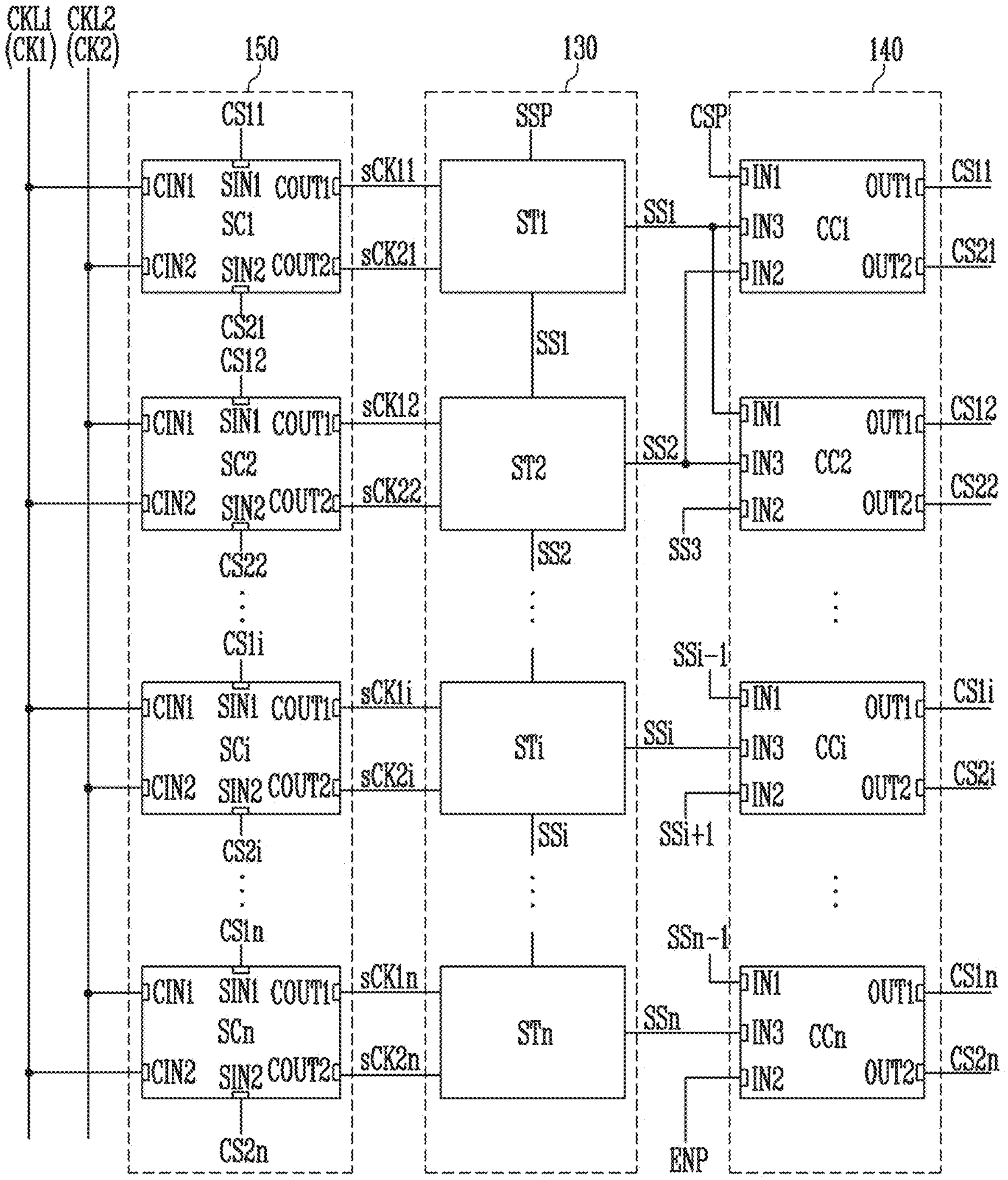
FIG. 2 is a diagram illustrating an embodiment of a scan driver, a clock controller, and a clock selector shown in FIG. 1.

FIG. 2 is a diagram illustrating an embodiment of the scan driver, the clock controller, and the clock selector shown in FIG. 1.

Referring to FIG. 2, the scan driver 130 may include a plurality of stage circuits ST1, ST2, . . . , STi, . . . , and STn. The stage circuits ST1 to STn may sequentially generate scan signals SS1, SS2, SS3, . . . , SSi−1, SSi, SSi+1, . . . , SSn−1, and SSn, while shifting the scan start signal SSP in response to the selection clock signals sCK1 and sCK2 (where i is a natural number). The scan signals SS1 to SSn generated in the stage circuits ST1 to STn may be sequentially supplied to the scan lines SL1 to SLn.

The first stage ST1 may output the scan signal SS1 in response to the selection clock signals sCK11 and sCK21 and the scan start signal SSP. The remaining stages ST2 to STn other than the first stage ST1 may receive a scan signal (or a carry signal) of a previous stage. For example, the second stage ST2 may output the scan signal SS2 in response to the scan signal SS1 of the first stage ST1 and the selection clock signals sCK12 and sCK22. Similarly, the n-th stage STn may output the scan signal SSn in response to the scan signal SSn−1 of an (n−1)-th stage and the selection clock signals sCK1*n* and sCK2*n*.

The clock controller 140 may include a plurality of control circuits CC1, CC2, . . . , CCi, . . . , and CCn. The control circuits CC1 to CCn may be positioned for each horizontal line, and may sequentially output the control signals CS1 and CS2 in the horizontal line unit in response to the clock start signal CSP and the scan signal. The control signals CS1 and CS2 generated in the control circuits CC1 to CCn may be supplied to the clock selector 150.

Each of the control circuits CC1 to CCn may include a first input terminal IN1, a second input terminal IN2, a third input terminal IN3, a first output terminal OUT1, and a second output terminal OUT2.

The first input terminal IN1 may receive the scan signal from a stage circuit positioned on a previous horizontal line. The second input terminal IN2 may receive the scan signal from a stage circuit positioned on a next horizontal line. The third input terminal IN3 may receive the scan signal from a stage circuit positioned on a current horizontal line. The first output terminal OUT1 may output the first control signal CS1, and the second output terminal OUT2 may output the second control signal CS2.

The clock start signal CSP may be input to the first input terminal IN1 of the first control circuit CC1 positioned on the first horizontal line. The clock start signal CSP may be supplied to overlap with the scan start signal SSP during at least a partial period. For example, the clock start signal CSP may be supplied to completely overlap with the scan start signal SSP. In addition, the end signal ENP may be input to the second input terminal IN2 of the n-th control circuit CCn positioned on the n-th horizontal line. The end signal ENP may be supplied to overlap with the n-th scan signal SSn during a certain period. For example, the end signal ENP may be a signal that is delayed by a half cycle of the clock signals CK1 and CK2 when compared to the n-th scan signal SSn.

In an embodiment, the (i−1)-th scan signal SSi−1 may be input to the first input terminal IN1 of the i-th control circuit CCi, the (i+1)-th scan signal SSi+1 may be input to the second input terminal IN2 of the i-th control circuit CCi, and the i-th scan signal SSi may be input to the third input terminal IN3 of the i-th control circuit CCi. In addition, the i-th control circuit CCi may output a first control signal CS1*i* through the first output terminal OUT1 and a second control signal CS2*i* through the second output terminal OUT2 during a period in which the scan signals SSi−1, SSi, and SSi+1 are input.

In an embodiment, the first control circuit CC1 may output the first control signal CS11 and the second control signal CS21 during a period in which the clock start signal CSP and the scan signals SS1 and SS2 are input. In an embodiment, the second control circuit CC2 may output the first control signal CS12 and the second control signal CS22 during a period in which the scan signals SS1, SS2, and SS3 are input. In an embodiment, the n-th control circuit CCn may output the first control signal CS1*n* and the second control signal CS2*n* during a period in which the scan signals SSn−1 and SSn and the end signal ENP are input.

The clock selector 150 may include a plurality of selection circuits SC1, SC2, . . . , SCi, . . . , and SCn. The selection circuits SC1 to SCn may be connected to a first clock line CKL1 and a second clock line CKL2. For example, a first clock input terminal CIN1 of odd-numbered selection circuits SC1, . . . , SCi, . . . may be connected to the first clock line CKL1 to which the first clock signal CK1 is supplied, and a second clock input terminal CIN2 of the odd-numbered selection circuits SC1, . . . , SCi, . . . may be connected to the second clock line CKL2 to which the second clock signal CK2 is supplied. In addition, a first clock input terminal CIN1 of even-numbered selection circuits SC2, . . . , and SCn may be connected to the second clock line CLK2, and a second clock input terminal CIN2 of the even-numbered selection circuits SC2, . . . , and SCn may be connected to the first clock line CKL1.

The selection circuits SC1 to SCn may be positioned for each horizontal line, and may selectively output the clock signals CK1 and CK2 in response to the control signals CS1 and CS2. As such, each of the selection circuits SC1 to SCn may further include a first control input terminal SIN1, a second control input terminal SIN2, a first clock output terminal COUT1, and a second clock output terminal COUT2.

The first control input terminal SIN1 may receive a first control signal CS1 from a control circuit positioned on the current horizontal line. The second control input terminal SIN2 may receive a second control signal CS2 from the control circuit positioned on the current horizontal line. The first clock output terminal COUT1 may output a first selection clock signal sCK1, and the second clock output terminal COUT2 may output a second selection clock signal sCK2.

In an embodiment, the first selection circuit SC1 may output the selection clock signals sCK11 and sCK21 during a period in which the first control signal CS11 and the second control signal CS21 are input. Here, the first selection clock signal sCK11 may correspond to the first clock signal CK1, and the second selection clock signal sCK21 may correspond to the second clock signal CK2.

In an embodiment, the second selection circuit SC2 may output the selection clock signals sCK12 and sCK22 during a period in which the first control signal CS12 and the second control signal CS22 are input. Here, the first selection clock signal sCK12 may correspond to the second clock signal CK2, and the second selection clock signal sCK22 may correspond to the first clock signal CK1.

In an embodiment, the i-th selection circuit SCi may output the selection clock signals sCK1*i* and sCK2*i* during a period in which the first control signal CS1*i* and the second control signal CS2*i* are input. Similarly, the n-th selection circuit SCn may output the selection clock signals sCK1*n* and sCK2*n* during a period in which the first control signal CS1*n* and the second control signal CS2*n* are input.

Each of the selection circuits SC1 to SCn may not output the selection clock signals sCK1 and sCK2 when the control signals CS1 and CS2 are not input. Therefore, each of the stages ST1 to STn receives the clock signals CK1 and CK2 (or the selection clock signals sCK1 and sCK2) during a period in which the scan signal is generated, and does not receive the clock signals CK1 and CK2 during other periods.

Figure 3:
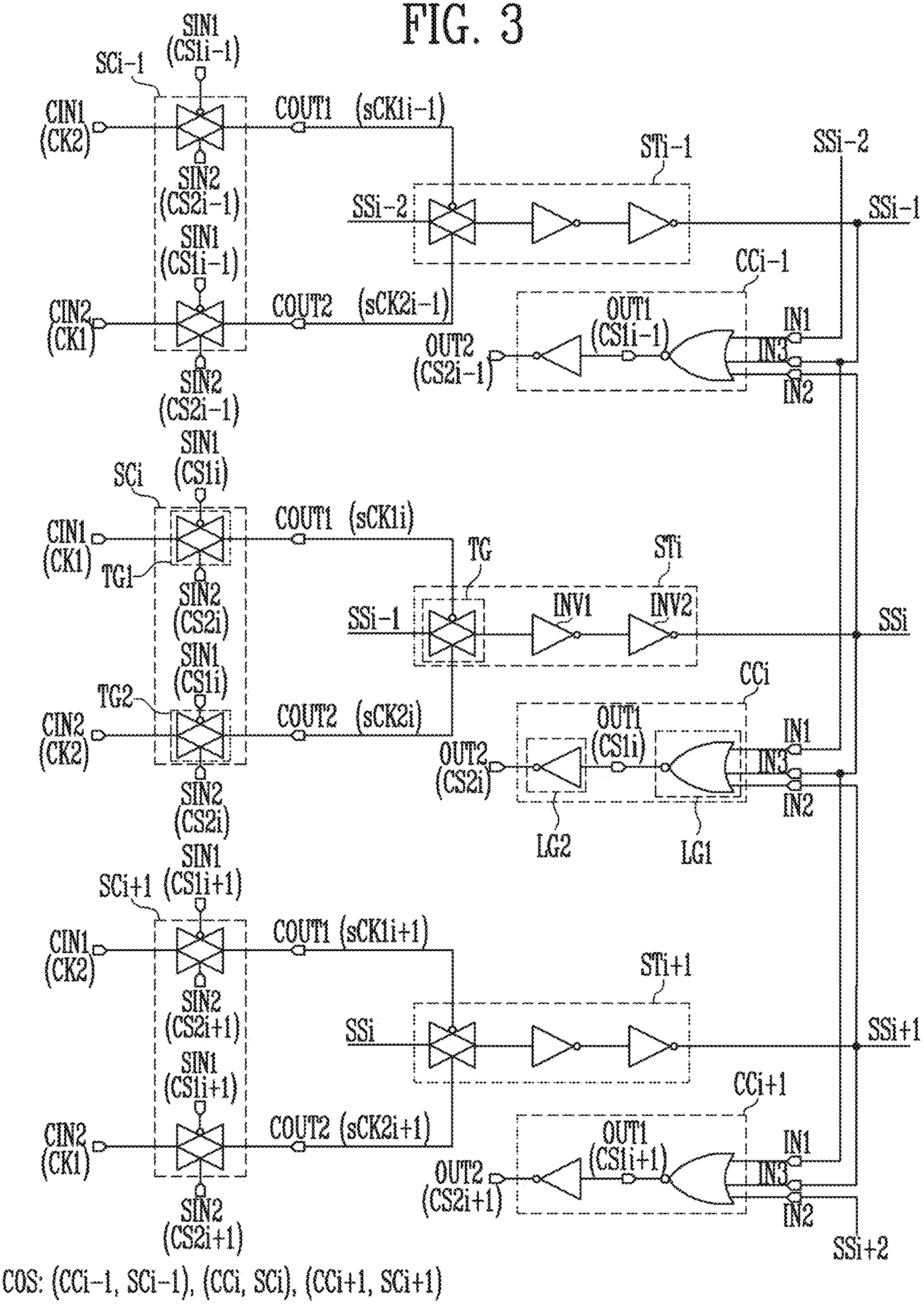
FIG. 3 is a diagram illustrating an embodiment of a stage circuit, a control circuit, and a selection circuit shown in FIG. 2.

FIG. 3 is a diagram illustrating an embodiment of the stage circuit, the control circuit, and the selection circuit shown in FIG. 2. In FIG. 3, the stage circuits STi−1, STi, and STi+1, the control circuits CCi−1, CCi, and CCi+1, and the selection circuits SCi−1, SCi, and SCi+1 positioned on the (i−1)-th horizontal line, the i-th horizontal line, and the (i+1)-th horizontal line are shown. As such, a circuit configuration may be described in more detail hereinafter based on the stage circuit STi, the control circuit CCi, and the selection circuit SCi positioned on the i-th horizontal line.

Referring to FIG. 3, the stage circuit STi may include a transmission gate TG, a first inverter INV1, and a second inverter INV2. The stage circuit STi may be implemented as various suitable circuits that include the transmission gate TG. For example, the stage circuit STi may be implemented as a CMOS circuit including a P-type transistor and an N-type transistor.

The transmission gate TG may supply the previous stage scan signal SSi−1 to the first inverter INV1 by delaying the previous stage scan signal SSi−1 by a half cycle of the clock signals CK1 and CK2 while being turned on and turning off when the selection clock signals sCK1*i* and sCK2*i* are supplied. The first inverter INV1 may invert an output signal of the transmission gate TG, and may supply it to the second inverter INV2. The second inverter INV2 may invert the output signal of the first inverter INV1, and may supply it to the scan line as the scan signal SSi.

The scan signal SSi may be delayed by the half cycle of the clock signals CK1 and CK2 and output compared to the previous stage scan signal SSi−1. In other words, the previous stage scan signal may be delayed by the half cycle of the clock signals CK1 and CK2 by the transmission gate TG and output, and thus, the scan driver 130 may sequentially output the scan signal.

The control circuit CCi may include a first logic gate LG1 and a second logic gate LG2. The first logic gate LG1 may be (e.g., may be set as) a NOR gate, and the second logic gate LG2 may be (e.g., may be set as) an inverter (e.g., a NOT gate).

The scan signal SSi−1 of the previous horizontal line (e.g., of the (i−1)-th stage circuit STi−1) may be input to a first input terminal IN1 of the first logic gate LG1. The scan signal SSi+1 of the next horizontal line (e.g., the (i+1)-th stage circuit STi+1) may be input to a second input terminal IN2. The scan signal SSi of the current horizontal line (e.g., the i-th stage circuit STi) may be input to a third input terminal IN3. In this case, the scan signal may have (e.g., may be set to) a high level of a voltage.

The first logic gate LG1 may perform a NOR operation on the scan signals SSi−1, SSi, and SSi+1. For example, the first logic gate LG1 may output a low level first control signal CS1*i* when at least one scan signal (any one of SSi−1, SSi, and SSi+1) is input, and may not output the first control signal CS1*i* (e.g., outputs a high level output) in other cases. The first control signal CS1*i* is output (or supplied) may mean that a low level voltage is supplied to the first output terminal OUT1, and the first control signal CS1*i* is not output may mean that a high level voltage is supplied to the first output terminal OUT1.

The second logic gate LG2 may invert the first control signal CS1*i* to generate the second control signal CS2*i*, and may output the second control signal CS2*i* to the second output terminal OUT2. The second control signal CS2*i* is output (or supplied) may mean that the high level voltage is supplied to the second output terminal OUT2, and the second control signal CS2*i* is not output may mean that the low level voltage is supplied to the second output terminal OUT2.

The selection circuit SCi may include a first transmission gate TG1 and a second transmission gate TG2. The first transmission gate TG1 may be turned on when the first control signal CS1*i* and the second control signal CS2*i* are supplied, to supply the first clock signal CK1 to the first clock output terminal COUT1. The first clock signal CK1 supplied to the first clock output terminal COUT1 may be supplied to the stage circuit STi as the first selection clock signal sCK1*i*.

The second transmission gate TG2 may be turned on when the first control signal CS1*i* and the second control signal CS2*i* are supplied, to supply the second clock signal CK2 to the second clock output terminal COUT2. The second clock signal CK2 supplied to the second clock output terminal COUT2 may be supplied to the stage circuit STi as the second selection clock signal sCK2*i*.

The first transmission gate TG1 and the second transmission gate TG2 may be in (e.g., may be set to) a turn-off state when the first control signal CS1*i* and the second control signal CS2*i* are not supplied. Therefore, when the first control signal CS1*i* and the second control signal CS2*i* are not supplied, the selection clock signals sCK1*i* and sCK2*i* are not supplied to the stage circuit STi.

As described above, in an embodiment of the present disclosure, the clock signals CK1 and CK2 may be selectively supplied to the stage circuit STi using the control circuit CCi and the selection circuit SCi. Therefore, a combination of the control circuit CCi and the selection circuit SCi may be referred to as a clock selection circuit COS. The clock selection circuit COS may be positioned at each horizontal line, and may selectively output the clock signals CK1 and CK2 in response to the scan signals.

Figure 4A:
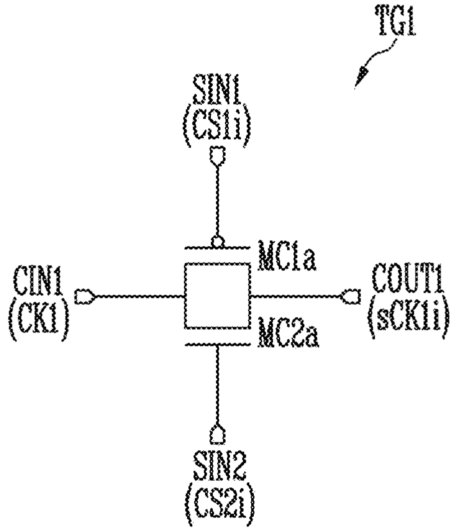
FIG. 4A is a diagram illustrating an embodiment of a first transmission gate shown in FIG. 3.
Figure 4B:
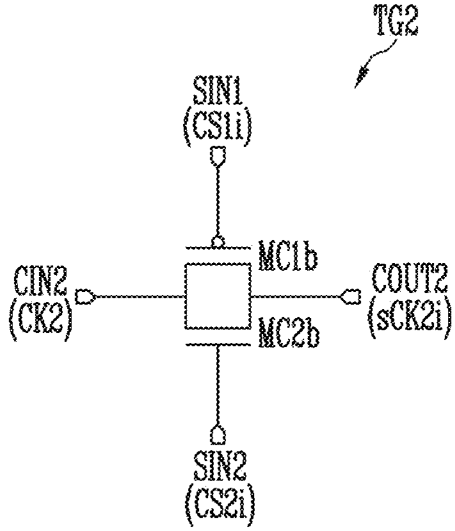
FIG. 4B is a diagram illustrating an embodiment of a second transmission gate shown in FIG. 3.

FIG. 4A is a diagram illustrating an embodiment of the first transmission gate shown in FIG. 3. FIG. 4B is a diagram illustrating an embodiment of the second transmission gate shown in FIG. 3. FIGS. 4A and 4B show the first transmission gate and the second transmission gate included in the i-th selection circuit SCi.

Referring to FIG. 4A, the first transmission gate TG1 may include a first control transistor MC1*a* and a second control transistor MC2*a* connected in parallel with each other between the first clock input terminal CIN1 and the first clock output terminal COUT1.

The first control transistor MC1*a* may be (e.g., may be set as) a P-type transistor, and a gate electrode thereof may be connected to the first control input terminal SIN1. The first control transistor MC1*a* may be turned on when the first control signal CS1*i* is input to the first control input terminal SIN1.

The second control transistor MC2*a* may be (e.g., may be set as) an N-type transistor, and a gate electrode thereof may be connected to the second control input terminal SIN2. The second control transistor MC2*a* may be turned on when the second control signal CS2*i* is input to the second control input terminal SIN2.

When the first control transistor MC1*a* and the second control transistor MC2*a* are turned on, or in other words, when the first transmission gate TG1 is turned on, the clock signal CK1 input to the first clock input terminal CIN1 may be supplied to the first clock output terminal COUT1 as the selection clock signal sCK1*i*.

Referring to FIG. 4B, the second transmission gate TG2 may include a first control transistor MC1*b* and a second control transistor MC2*b* connected in parallel with each other between the second clock input terminal CIN2 and the second clock output terminal COUT2.

The first control transistor MC1*b* may be (e.g., may be set as) a P-type transistor, and a gate electrode thereof may be connected to the first control input terminal SIN1. The first control transistor MC1*b* may be turned on when the first control signal CS1*i* is input to the first control input terminal SIN1.

The second control transistor MC2*b* may be (e.g., may be set as) an N-type transistor, and a gate electrode thereof may be connected to the second control input terminal SIN2. The second control transistor MC2*b* may be turned on when the second control signal CS2*i* is input to the second control input terminal SIN2.

When the first control transistor MC1*b* and the second control transistor MC2*b* are turned on, or in other words, when the second transmission gate TG2 is turned on, the clock signal input to the second clock input terminal CIN2 CK2 may be supplied to the second clock output terminal COUT2 as the selection clock signal sCK2*i*.

Figure 5:
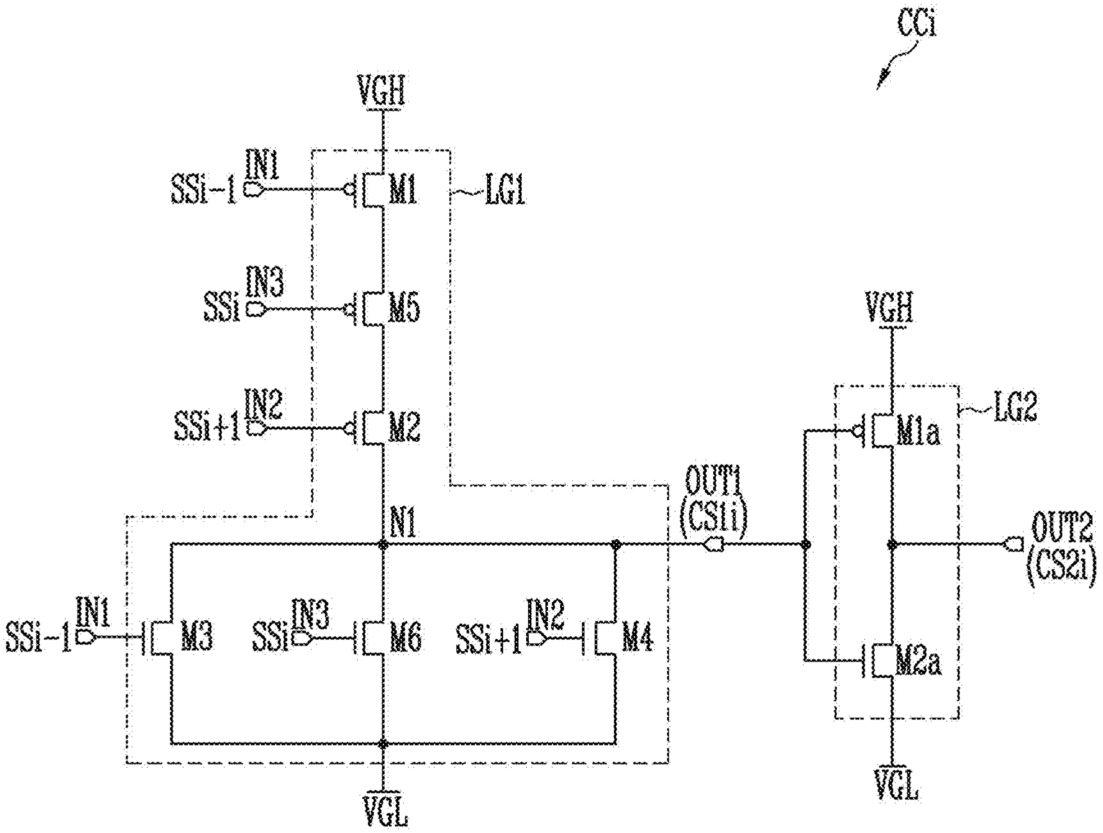
FIG. 5 is a diagram illustrating an embodiment of a first logic gate and a second logic gate shown in FIG. 3.

FIG. 5 is a diagram illustrating an embodiment of the first logic gate and the second logic gate shown in FIG. 3. FIG. 5 shows the first logic gate and the second logic gate included in the i-th control circuit CCi.

Referring to FIG. 5, the first logic gate LG1 may be a NOR gate. The first logic gate LG1 may include a first transistor M1, a fifth transistor M5, and a second transistor M2 that are connected in series with each other between a first power source VGH and a first node N1 (e.g., the first output terminal OUT1). The first logic gate LG1 may further include a third transistor M3, a sixth transistor M6, and a fourth transistor M4 that are connected in parallel with each other between the first node N1 and a second power source VGL.

The first power source VGH may have (e.g., may be set to) a high level voltage, and the second power source VGL may have (e.g., may be set to) a low level voltage lower than that of the first power source VGH. The first transistor M1, the second transistor M2, and the fifth transistor M5 may be (e.g., may be set as) P-type transistors, and the third transistor M3, the fourth transistor M4, and the sixth transistor M6 may be (e.g., may be set as) N-type transistors.

A gate electrode of the first transistor M1 may be connected to the first input terminal IN1. The first transistor M1 may be turned off when the scan signal SSi−1 is supplied (e.g., when a high level scan signal is supplied), and may be turned on when the scan signal SSi−1 is not supplied (e.g., when a low level scan signal is supplied).

A gate electrode of the second transistor M2 may be connected to the second input terminal IN2. The second transistor M2 may be turned off when the scan signal SSi+1 is supplied, and may be turned on when the scan signal SSi+1 is not supplied.

A gate electrode of the fifth transistor M5 may be connected to the third input terminal IN3. The fifth transistor M5 may be turned off when the scan signal SSi is supplied, and may be turned on when the scan signal SSi is not supplied.

A gate electrode of the third transistor M3 may be connected to the first input terminal IN1. The third transistor M3 may be turned on when the scan signal SSi−1 is supplied (e.g., when a high level scan signal is supplied), and may be turned off when the scan signal SSi−1 is not supplied (e.g., when a low level scan signal is supplied).

A gate electrode of the fourth transistor M4 may be connected to the second input terminal IN2. The fourth transistor M4 may be turned on when the scan signal SSi+1 is supplied, and may be turned off when the scan signal SSi+1 is not supplied.

A gate electrode of the sixth transistor M6 may be connected to the third input terminal IN3. The sixth transistor M6 may be turned on when the scan signal SSi is supplied, and may be turned off when the scan signal SSi is not supplied.

When at least one scan signal from among the (i−1)-th scan signal SSi−1, the i-th scan signal SSi, and/or the (i+1)-th scan signal SSi+1 (e.g., at least one of SSi−1, SSi, or SSi+1) is supplied, at least one transistor from among the first transistor M1, the second transistor M2, and/or the fifth transistor M5 (e.g., at least one of M1, M2, or M5) is turned off. In this case, a voltage of the first power source VGH is not supplied to the first node N1.

When at least one scan signal from among the (i−1)-th scan signal SSi−1, the i-th scan signal SSi, and/or the (i+1)-th scan signal SSi+1 (e.g., at least one of SSi−1, SSi, or SSi+1) is supplied, at least one transistor from among the third transistor M3, the fourth transistor M4, and/or the sixth transistor M6 (e.g., at least one of M3, M4, or M6) may be turned on. Then, a voltage of the second power source VGL, or in other words, a low level voltage, may be supplied to the first node N1. The voltage of the second power source VGL supplied to the first node N1 may be supplied to the first output terminal OUT1 as the first control signal CS1*i* (e.g., a low level first control signal).

When the first control signal CS1*i* is supplied to the first output terminal OUT1, the transmission gates TG1 and TG2 may have (e.g., may be set to) a turn-on state, and the selection clock signals sCK1*i* and sCK2*i* may be output in response thereto.

When the (i−1)-th scan signal SSi−1, the i-th scan signal SSi, and the (i+1)-th scan signal SSi+1 are not supplied, the first transistor M1, the second transistor M2, and the fifth transistor M5 are turned on. In this case, the voltage of the first power source VGH may be supplied to the first node N1. The voltage of the first power source VGH supplied to the first node N1 may be supplied to the first output terminal OUT1. When the voltage of the first power source VGH is supplied to the first output terminal OUT1, the supply of the first control signal CS1*i* is stopped (e.g., a high level first control signal is supplied).

When the supply of the first control signal CS1*i* to the first output terminal OUT1 is stopped, the transmission gates TG1 and TG2 may have (e.g., may be set to) a turn-off state, and the selection clock signals sCK1*i* and sCK2*i* are not output in response thereto.

When the (i−1)-th scan signal SSi−1, the i-th scan signal SSi, and the (i+1)-th scan signal SSi+1 are not supplied, the third transistor M3, the fourth transistor M4, and the sixth transistor M6 are turned off. Then, an electrical connection of the first node N1 and the second power source VGL to each other is cut off, and the first node N1 may maintain or substantially maintain the voltage of the first power source VGH.

The second logic gate LG2 may be an inverter (e.g., a NOT gate). The second logic gate LG2 may invert a voltage of the first output terminal OUT1. For example, the second logic gate LG2 may generate the second control signal CS2*i* by inverting the first control signal CS1*i*. The second logic gate LG2 may include a first transistor M1*a* and a second transistor M2*a* connected in series with each other between the first power source VGH and the second power source VGL.

A gate electrode of the first transistor M1*a* and a gate electrode of the second transistor M2*a* may be connected to the first output terminal OUT1. The second output terminal OUT2 may be connected to a common node between the first transistor M1*a* and the second transistor M2*a*. The first transistor M1*a* may be (e.g., may be set as) a P-type transistor, and the second transistor M2*a* may be (e.g., may be set as) an N-type transistor.

When a low level of the first control signal CS1*i* is supplied to the first output terminal OUT1, the first transistor M1*a* may be turned on and the second transistor M2*a* may be turned off. When the first transistor M1*a* is turned on, the voltage of the first power source VGH may be supplied to the second output terminal OUT2. The voltage of the first power source VGH supplied to the second output terminal OUT2 may be supplied to the transmission gates TG1 and TG2 as the second control signal CS2*i* (e.g., a high level second control signal).

When a high level of the first control signal CS1*i* is supplied to the first output terminal OUT1, the first transistor M1*a* may be turned off and the second transistor M2*a* may be turned on. When the second transistor M2*a* is turned on, the voltage of the second power source VGL may be supplied to the second output terminal OUT2. When the voltage of the second power source VGL is output to the second output terminal OUT2, supply of the second control signal CS2*i* is stopped (e.g., a low level second control signal is supplied).

Figure 6:
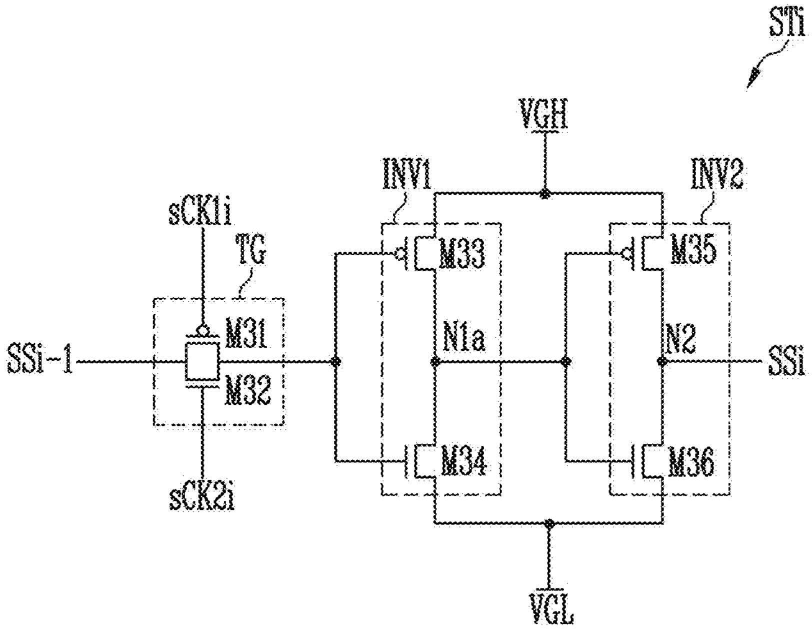
FIG. 6 is a diagram illustrating an embodiment of a stage circuit.

FIG. 6 is a diagram illustrating an embodiment of a stage circuit. FIG. 6 shows an example of the i-th stage circuit STi.

Referring to FIG. 6, the stage circuit STi may include a transmission gate TG, a first inverter INV1, and a second inverter INV2. When the selection clock signals sCK1*i* and sCK2*i* are input, the transmission gate TG may delay the previous stage scan signal SSi−1 by a half cycle, and supply it to the first inverter INV1.

The transmission gate TG may include a first transistor M31 and a second transistor M32. The first transistor M31 may be (e.g., may be set as) a P-type transistor, and may be turned on and turned off in response to the first selection clock signal sCK1*i*. The second transistor M32 may be (e.g., may be set as) an N-type transistor, and may be turned on and turned off in response to the second selection clock signal sCK2*i*.

The first inverter INV1 may invert an output signal of the transmission gate TG. The first inverter INV1 may include a P-type third transistor M33 and an N-type fourth transistor M34 that are connected in series with each other between the first power source VGH and the second power source VGL. A gate electrode of the third transistor M33 and a gate electrode of the fourth transistor M34 may be connected to the transmission gate TG.

The second inverter INV2 may invert an output signal of the first inverter INV1. An output signal of the second inverter INV2 may be supplied to the scan line as the scan signal SSi. The second inverter INV2 may include a P-type fifth transistor M35 and an N-type sixth transistor M36 that are connected in series with each other between the first power source VGH and the second power source VGL. A gate electrode of the fifth transistor M35 and a gate electrode of the sixth transistor M36 may be connected to a first node N1*a*, which is a common node between the third transistor M33 and the fourth transistor M34.

Figure 7:
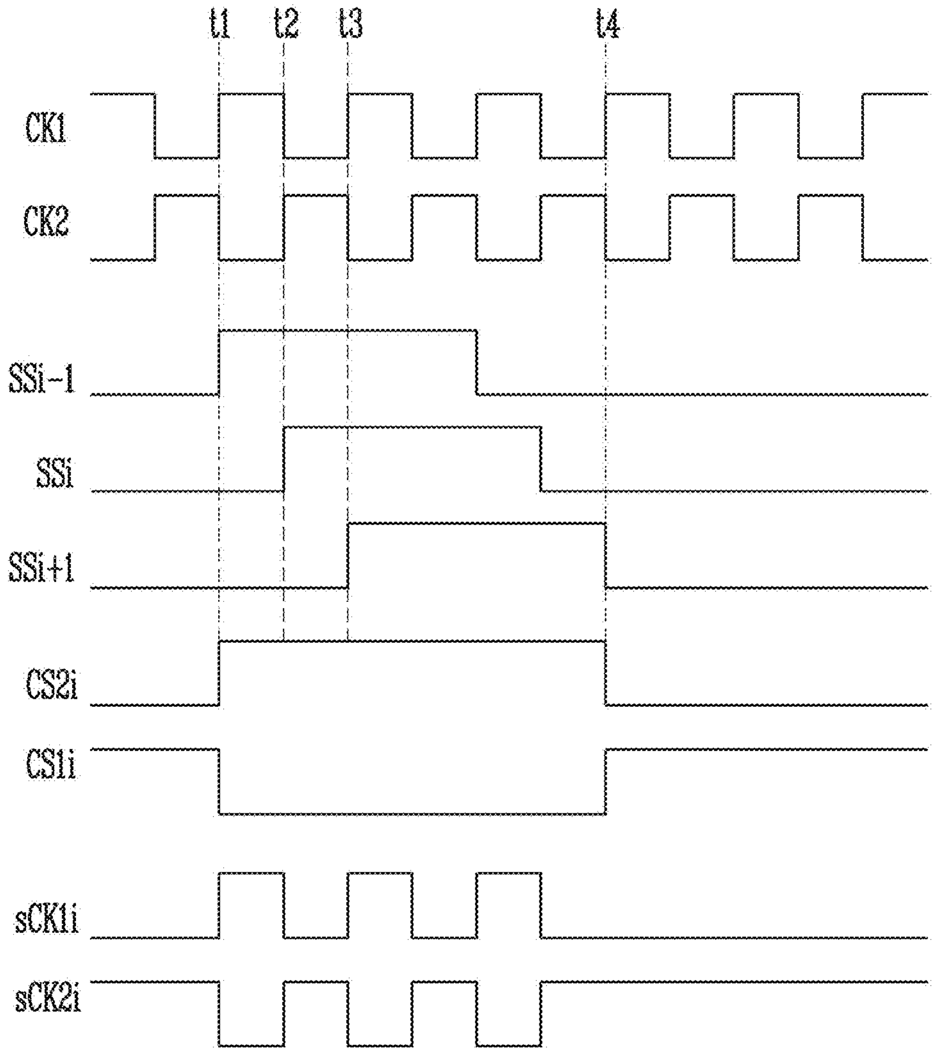
FIG. 7 is a diagram illustrating a driving method according to an embodiment of the present disclosure.

FIG. 7 is a diagram illustrating a driving method according to an embodiment of the present disclosure. In FIG. 7, an operation process of the i-th control circuit CCi is mainly illustrated.

Referring to FIGS. 3 to 7, the first clock signal CK1 and the second clock signal CK2 may be square wave signals having the same period with and inverted phases as each other.

At a first time point t1, the (i−1)-th scan signal SSi−1 is input to the i-th control circuit CCi. When the (i−1)-th scan signal SSi−1 is input, the first control signal CS1*i* may be output from the first logic gate LG1, and the second control signal CS2*i* may be output from the second logic gate LG2.

The first control signal CS1*i* and the second control signal CS2*i* output from the i-th control circuit CCi are supplied to the i-th selection circuit SCi. Then, the first transmission gate TG1 and the second transmission gate TG2 included in the i-th selection circuit SCi may be turned on. When the first transmission gate TG1 is turned on, the first clock signal CK1 may be supplied to the i-th stage circuit STi as the first selection clock signal sCK1*i*. When the second transmission gate TG2 is turned on, the second clock signal CK2 may be supplied to the i-th stage circuit STi as the second selection clock signal sCK2*i*.

At a second time point t2, the i-th stage circuit STi may generate the scan signal SSi in response to the first clock selection circuit sCK1*i* and the second selection clock signal sCK2*i*, and may supply the generated scan signal SSi to the scan line. In addition, the scan signal SSi generated in the i-th stage circuit STi may be input to the i-th control circuit CCi.

At a third time point t3, the (i+1)-th scan signal SSi is input to the i-th control circuit CCi. The i-th control circuit CCi may maintain or substantially maintain an output of the first control signal CS1*i* and the second control signal CS2*i* during a period in which the (i−1)-th scan signal SSi−1, the i-th scan signal SSi, and the (i+1)-th scan signal SSi+1 are supplied.

At a fourth time point t4, supply of the (i+1)-th scan signal SSi+1 is stopped, and thus, supply of the first control signal CS1*i* and the second control signal CS2*i* from the i-th control circuit CCi is stopped. When supply of the first control signal CS1*i* and the second control signal CS2*i* is stopped, supply of the selection clock signals sCK1*i* and sCK2*i* from the i-th selection circuit SCi is stopped.

In other words, in an embodiment of the present disclosure, the selection clock signals sCK1*i* and sCK2*i* are supplied (e.g., only supplied) during a period in which the scan signal SSi is generated, and the selection clock signals sCK1*i* and sCK2*i* are not supplied in other periods. When the selection clock signal sCK1*i* and sCK2*i* are not supplied, the transmission gate TG included in the i-th stage circuit STi may be prevented from turning on and turning off unnecessarily, thereby reducing power consumption.

Figure 8:
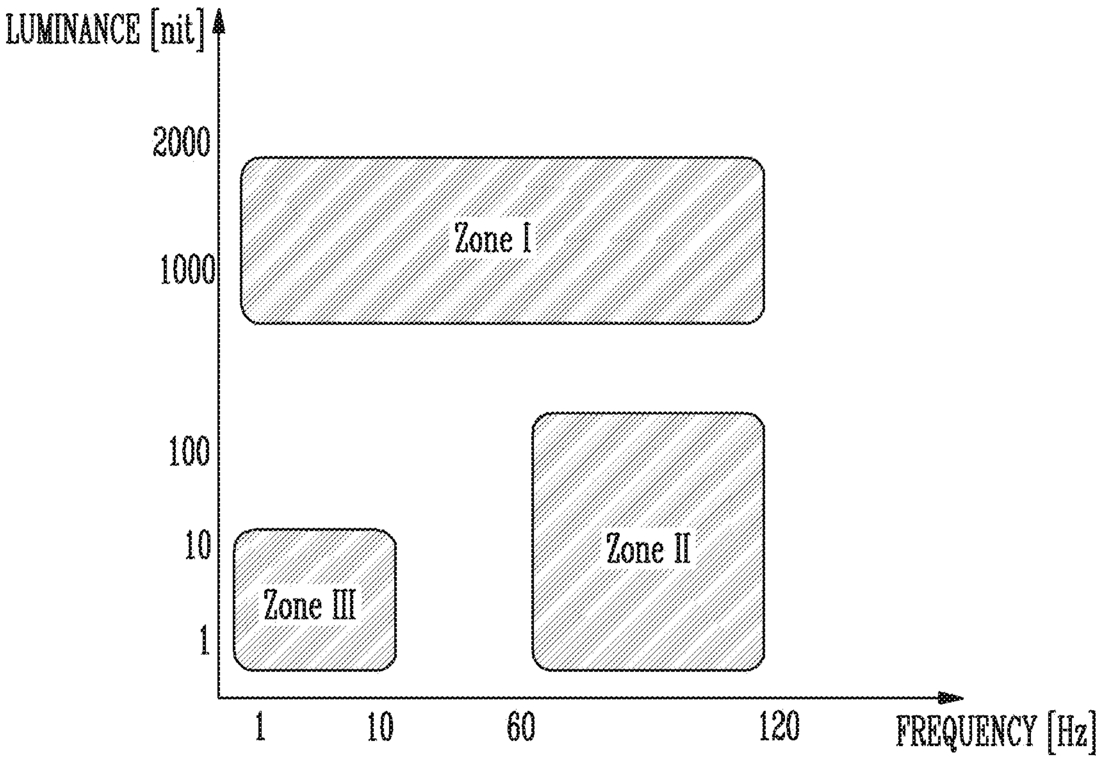
FIG. 8 is a diagram illustrating power consumption of a display device according to an embodiment of the present disclosure.

FIG. 8 is a diagram illustrating power consumption of a display device according to an embodiment of the present disclosure.

Referring to FIG. 8, the power consumption of the display device 100 may be described as a "Zone I", a "Zone II", and a "Zone III". The "Zone I" may refer to a case where the display device 100 is driven with a high luminance (e.g., 800 nit or more). For example, the "Zone I" may include power consumed when the display device 100 displays a moving image outdoors.

The "Zone II" may refer to a case where the display device 100 is driven at a high driving frequency (e.g., 60 Hz or more) and a relatively low luminance (e.g., 100 nit or less). For example, the "Zone II" may include power consumed when the display device 100 displays a moving image in a dark place.

The "Zone III" may refer to a case where the display device 100 is driven at a low driving frequency (e.g., 10 Hz or less) and a low luminance (e.g., 10 nit or less). For example, the "Zone III" may include power consumed in a standby mode of the display device 100.

When the clock signals CK1 and CK2 are selectively supplied to the scan driver 130 as in one or more embodiments of the present disclosure, power consumption may be reduced in the "Zone I", the "Zone II", and the "Zone III", and especially, power consumption improvement may be the greatest in the "Zone III".

Figure 9:
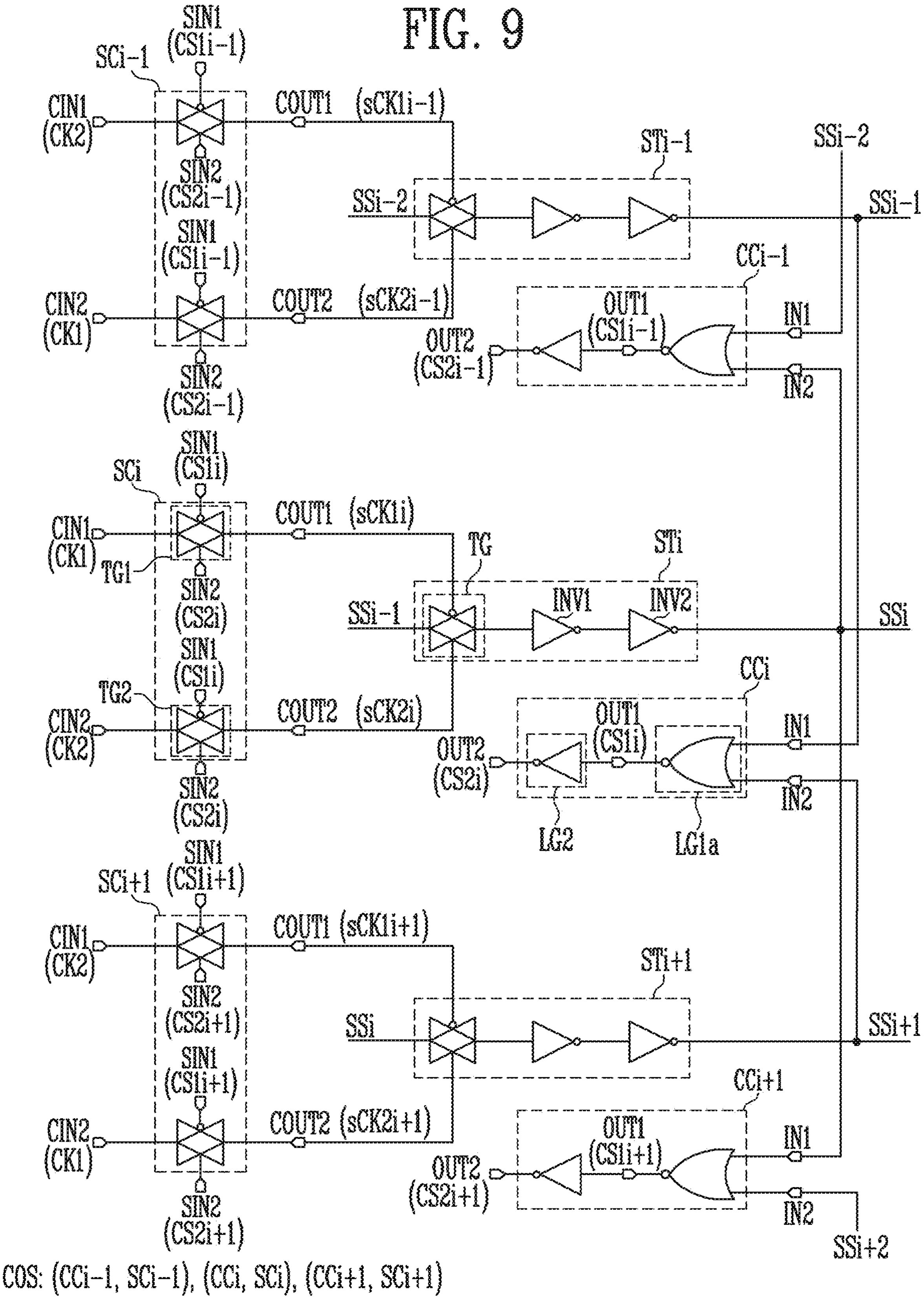
FIG. 9 is a diagram illustrating an embodiment of the stage circuit, the control circuit, and the selection circuit shown in FIG. 2.

FIG. 9 is a diagram illustrating an embodiment of the stage circuit, the control circuit, and the selection circuit shown in FIG. 2. FIG. 9 shows the stage circuits STi−1, STi, and STi+1, the control circuits CCi−1, CCi, and CCi+1, and the selection circuits SCi−1, SCi, and SCi+1 positioned on the (i−1)-th horizontal line, the i-th horizontal line, and the (i+1)-th horizontal line. In FIG. 9, the same reference numerals are assigned to the same or substantially the same configurations as those described above with reference to FIG. 3, and thus, redundant description may not be repeated.

Referring to FIG. 9, the stage circuit STi may include a transmission gate TG, a first inverter INV1, and a second inverter INV2. The selection circuit SCi may include a first transmission gate TG1 and a second transmission gate TG2.

The control circuit CCi may include a first logic gate LG1*a* and a second logic gate LG2. The first logic gate LG1*a* may be (e.g., may be set as) a NOR gate, and the second logic gate LG2 may be (e.g., may be set as) an inverter (e.g., a NOT gate).

The scan signal SSi−1 of the previous horizontal line (e.g., the (i−1)-th stage circuit STi−1) may be input to the first input terminal IN1 of the first logic gate LG1*a*, and the scan signal SSi+1 of the next horizontal line (e.g., the (i+1)-th stage circuit STi+1) may be input to the second input terminal IN2.

The first logic gate LG1*a* may perform a NOR operation on the scan signals SSi−1 and SSi+1. For example, the first logic gate LG1 may output a low level first control signal CS1*i* when at least one scan signal (e.g., any one of SSi−1 or SSi+1) is input, and does not output the first control signal CS1*i* (e.g., outputs a high level voltage) in other cases.

In FIG. 9, the first logic gate LG1*a* is driven by receiving two scan signals SSi−1 and SSi+1. Even though the first logic gate LG1*a* receives the two scan signals SSi−1 and SSi+1, the first logic gate LG1*a* may generate the first control signal CS1*i* having the same or substantially the same timing as that of the first logic gate LG1 shown in FIG. 3. In other words, in an embodiment of the present disclosure, scan signals input to the first logic gates LG1 and LG1*a* may be controlled as needed or desired.

Figure 10:
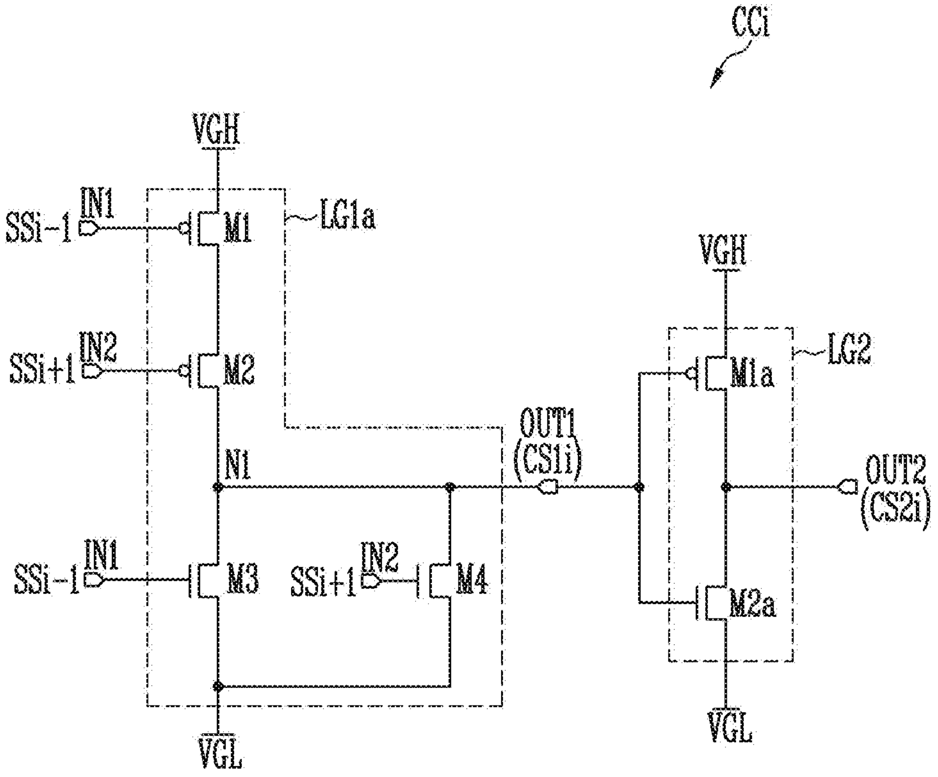
FIG. 10 is a diagram illustrating an embodiment of a first logic gate and a second logic gate shown in FIG. 9.

FIG. 10 is a diagram illustrating an embodiment of the first logic gate and the second logic gate shown in FIG. 9. FIG. 10 shows the first logic gate and the second logic gate included in the i-th control circuit CCi. In FIG. 10, the same reference numerals are assigned to the same or substantially the same (or similar) configurations as those described above with reference to FIG. 5.

Referring to FIG. 10, the first logic gate LG1*a* may be a NOR gate. The first logic gate LG1*a* may include a first transistor M1 and a second transistor M2 connected in series with each other between the first power source VGH and the first node N1 (e.g., the first output terminal OUT1). The first logic gate LG1*a* further includes a third transistor M3 and a fourth transistor M4 that are connected in parallel with each other between the first node N1 and the second power source VGL.

The first transistor M1 and the second transistor M2 may be (e.g., may be set as) P-type transistors, and the third transistor M3 and fourth transistor M4 may be (e.g., may be set as) N-type transistors.

A gate electrode of the first transistor M1 may be connected to the first input terminal IN1. The first transistor M1 may be turned off when the scan signal SSi−1 is supplied (e.g., when a high level scan signal is supplied), and may be turned on when the scan signal SSi−1 is not supplied (e.g., when a low level scan signal is supplied).

A gate electrode of the second transistor M2 may be connected to the second input terminal IN2. The second transistor M2 may be turned off when the scan signal SSi+1 is supplied, and may be turned on when the scan signal SSi+1 is not supplied.

A gate electrode of the third transistor M3 may be connected to the first input terminal IN1. The third transistor M3 may be turned on when the scan signal SSi−1 is supplied (e.g., when a high level scan signal is supplied), and may be turned off when the scan signal SSi−1 is not supplied (e.g., when a low level scan signal is supplied).

A gate electrode of the fourth transistor M4 may be connected to the second input terminal IN2. The fourth transistor M4 may be turned on when the scan signal SSi+1 is supplied, and may be turned off when the scan signal SSi+1 is not supplied.

When at least one scan signal of the (i−1)-th scan signal SSi−1 and/or the (i+1)-th scan signal SSi+1 (e.g., at least one of SSi−1 or SSi+1) is supplied, at least one transistor of the first transistor M1 and/or the second transistor M2 (e.g., at least one of M1 or M2) is turned off. In this case, a voltage of the first power source VGH is not supplied to the first node N1.

When at least one scan signal of the (i−1)-th scan signal SSi−1 and/or the (i+1)-th scan signal SSi+1 (e.g., at least one of SSi−1 or SSi+1) is supplied, at least one transistor of the third transistor M3 and/or the fourth transistor M4 (e.g., at least one of M3 or M4) may be turned on. Then, a voltage of the second power source VGL, or in other words, a low level voltage, may be supplied to the first node N1. The voltage of the second power source VGL supplied to the first node N1 may be supplied to the first output terminal OUT1 as the first control signal CS1*i* (e.g., a low level first control signal).

When the first control signal CS1*i* is supplied to the first output terminal OUT1, the transmission gates TG1 and TG2 may have (e.g., may be set to) a turn-on state, and the selection clock signals sCK1*i* and sCK2*i* may be output in response thereto.

When the (i−1)-th scan signal SSi−1 and the (i+1)-th scan signal SSi+1 are not supplied, the first transistor M1 and the second transistor M2 are turned on. In this case, the voltage of the first power source VGH may be supplied to the first node N1. The voltage of the first power source VGH supplied to the first node N1 may be supplied to the first output terminal OUT1. When the voltage of the first power source VGH is supplied to the first output terminal OUT1, supply of the first control signal CS1*i* may be stopped (e.g., a high level first control signal is supplied).

When the supply of the first control signal CS1*i* to the first output terminal OUT1 is stopped, the transmission gates TG1 and TG2 may have (e.g., may be set to) a turn-off state, and the selection clock signals sCK1*i* and sCK2*i* are not output in response thereto.

In FIG. 10, the previous stage scan signal supplied to the first logic gate LG1*a* is shown as the (i−1)-th scan signal SSi−1, and the next stage scan signal is shown as the (i+1)-th scan signal SSi+1, but the present disclosure is not limited thereto. For example, the previous stage scan signal and the next stage scan signal may be variously determined in consideration of a width and an overlap degree of the scan signal.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A clock selection circuit comprising:

a control circuit configured to output a first control signal and a second control signal by inverting the first control signal, when at least one scan signal of a previous stage scan signal or a next stage scan signal is input; and a selection circuit configured to receive clock signals, and output the clock signals when the first control signal and the second control signal are input, wherein the control circuit is configured to maintain inverted levels of the first control signal and the second control signal during a period in which both the previous stage scan signal and the next stage scan signal are output.

2. The clock selection circuit according to claim 1, wherein the control circuit comprises:

a first logic gate configured to:

receive the previous stage scan signal through a first input terminal, and the next stage scan signal through a second input terminal; and output the first control signal through a first output terminal; and a second logic gate configured to:

receive the first control signal; and output the second control signal through a second output terminal by inverting the first control signal.

3. The clock selection circuit according to claim 2, wherein the previous stage scan signal and the next stage scan signal have a high level voltage, and wherein the first logic gate is configured to output a low level of the first control signal by performing a NOR operation on the previous stage scan signal and the next stage scan signal.

4. The clock selection circuit according to claim 2, wherein the first logic gate comprises:

a first transistor and a second transistor connected in series with each other between a first power source and a first node; and a third transistor and a fourth transistor connected in parallel with each other between the first node and a second power source having a voltage lower than that of the first power source, and wherein the first transistor and the second transistor are P-type transistors, and the third transistor and the fourth transistor are N-type transistors.

5. The clock selection circuit according to claim 4, wherein a gate electrode of the first transistor and a gate electrode of the third transistor are connected to the first input terminal, and wherein a gate electrode of the second transistor and a gate electrode of the fourth transistor are connected to the second input terminal.

6. The clock selection circuit according to claim 5, wherein the first logic gate further comprises a third input terminal configured to receive a current stage scan signal.

7. The clock selection circuit according to claim 6, wherein the first logic gate further comprises:

a fifth transistor connected in series to the first transistor and the second transistor between the first power source and the first node; and a sixth transistor connected in parallel to the third transistor and the fourth transistor between the first node and the second power source, and wherein the fifth transistor is a P-type transistor and the sixth transistor is an N-type transistor.

8. The clock selection circuit according to claim 7, wherein a gate electrode of the fifth transistor and a gate electrode of the sixth transistor are connected to the third input terminal.

9. The clock selection circuit according to claim 2, wherein the second logic gate is an inverter configured to output the second control signal by inverting the first control signal.

10. The clock selection circuit according to claim 9, wherein the second logic gate comprises a P-type first transistor and an N-type second transistor that are connected in series with each other between a first power source and a second power source having a voltage lower than that of the first power source, and wherein a gate electrode of the P-type first transistor and a gate electrode of the N-type second transistor are connected to the first output terminal, and a common node between the P-type first transistor and the N-type second transistor is connected to the second output terminal.

11. The clock selection circuit according to claim 1, wherein the selection circuit comprises:

a first transmission gate connected between a first clock input terminal and a first clock output terminal, the first clock input terminal being configured to receive a first clock signal, and the first transmission gate being configured to be turned on when the first control signal and the second control signal are input; and a second transmission gate connected between a second clock input terminal and a second clock output terminal, the second clock input terminal being configured to receive a second clock signal, and the second transmission gate being configured to be turned on when the first control signal and the second control signal are input.

12. The clock selection circuit according to claim 11, wherein the first transmission gate comprises a P-type first control transistor and an N-type second control transistor that are connected in parallel with each other between the first clock input terminal and the first clock output terminal, and wherein the P-type first control transistor is configured to be turned on when the first control signal is input, and the N-type second control transistor is configured to be turned on when the second control signal is input.

13. The clock selection circuit according to claim 11, wherein the second transmission gate comprises a P-type first control transistor and an N-type second control transistor that are connected in parallel with each other between the second clock input terminal and the second clock output terminal, and wherein the P-type first control transistor is configured to be turned on when the first control signal is input, and the N-type second control transistor is configured to be turned on when the second control signal is input.

14. A display device comprising:

pixels connected to scan lines and data lines;

a scan driver configured to supply a scan signal to the scan lines;

a clock controller configured to sequentially output a first control signal and a second control signal by inverting the first control signal in a horizontal line unit in response to the scan signal sequentially input in the horizontal line unit; and a clock selector configured to receive clock signals for driving the scan driver, and supply the clock signals to the scan driver in the horizontal line unit in response to the first control signal and the second control signal, wherein the clock controller is configured to maintain inverted levels of the first control signal and the second control signal during a period in which both a previous scan signal and a next scan signal of the scan signal are output.

15. The display device according to claim 14, wherein the scan driver comprises a stage circuit located for each horizontal line, wherein the clock controller comprises a control circuit located for each horizontal line, and wherein the clock selector comprises a selection circuit located for each horizontal line.

16. The display device according to claim 15, wherein a stage circuit of a first horizontal line is configured to receive a scan start signal, and wherein a control circuit of the first horizontal line is configured to receive a clock start signal overlapping with the scan start signal.

17. The display device according to claim 15, wherein a control circuit of a last horizontal line is configured to receive an end signal overlapping with a scan signal corresponding to the last horizontal line during a partial period.

18. The display device according to claim 15, wherein an i-th control circuit of an i-th horizontal line is configured to output the first control signal and the second control signal in response to the previous scan signal of a previous horizontal line and the next scan signal of a next horizontal line, where i is a natural number.

19. The display device according to claim 18, wherein the i-th control circuit comprises:

a first logic gate configured to generate the first control signal by performing a NOR operation on the previous scan signal and the next scan signal; and a second logic gate configured to generate the second control signal by inverting the first control signal.

20. The display device according to claim 15, wherein an i-th control circuit of an i-th horizontal line is configured to output the first control signal and the second control signal in response to the previous scan signal of a previous horizontal line, a current scan signal of a current horizontal line, and the next scan signal of a next horizontal line, where i is a natural number.

21. The display device according to claim 20, wherein the i-th control circuit comprises:

a first logic gate configured to generate the first control signal by performing a NOR operation on the previous scan signal, the current scan signal, and the next scan signal; and a second logic gate configured to generate the second control signal by inverting the first control signal.

22. The display device according to claim 15, wherein an i-th selection circuit of an i-th horizontal line is configured to receive a first clock signal and a second clock signal, and supply the first clock signal and the second clock signal to an i-th stage circuit of the i-th horizontal line when an i-th first control signal and an i-th second control signal are input from an i-th control circuit of the i-th horizontal line, where i is a natural number.

23. The display device according to claim 22, wherein the i-th selection circuit comprises:

a first transmission gate configured to receive the first clock signal, and supply the first clock signal to the i-th stage circuit by being turned on when the i-th first control signal and the i-th second control signal are supplied; and a second transmission gate configured to receive the second clock signal, and supply the second clock signal to the i-th stage circuit by being turned on when the i-th first control signal and the i-th second control signal are supplied.

24. The display device according to claim 23, wherein the i-th stage circuit comprises a transmission gate configured to be turned on and turned off in response to the first clock signal and the second clock signal.

25. A method of driving a display device, the method comprising:

sequentially generating a scan signal in a scan driver;

sequentially generating a first control signal and a second control signal by inverting the first control signal in a clock controller in response to the scan signal; and sequentially supplying clock signals used for generating the scan signal from a clock selector to the scan driver in response to the first control signal and the second control signal, wherein inverted levels of the first control signal and the second control signal are maintained by the clock controller during a period in which both a previous stage scan signal and a next stage scan signal of the scan signal are output.

26. The method according to claim 25, wherein the clock controller generates a first-first control signal and a first-second control signal corresponding to a first horizontal line in response to a clock start signal overlapping with a scan start signal supplied to the scan driver.

* * * * *